No. 711,406. Patented Oct. 14, 1902.
T. J. LEABO.
FLUID PRESSURE BRAKE.
(Application filed Jan. 30, 1902.)
(No Model.)
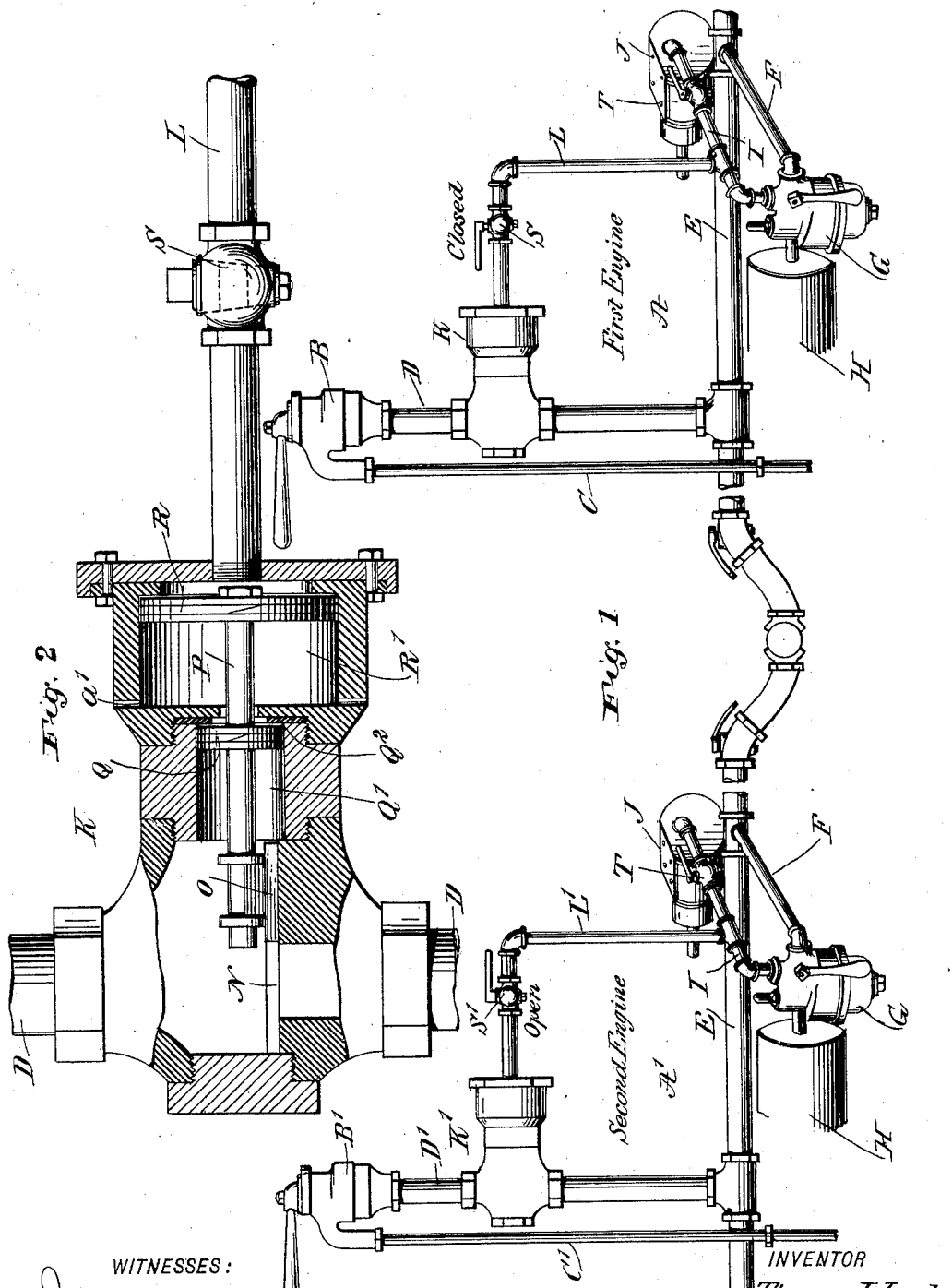
INVENTOR
Thomas J. Leabo
BY
ATTORNEYS
WITNESSES:

UNITED STATES PATENT OFFICE.

THOMAS J. LEABO, OF CHANUTE, KANSAS, ASSIGNOR TO HIMSELF, JACOB H. SHURTZ, AND MARK A. LEA, OF CHANUTE, KANSAS.

FLUID-PRESSURE BRAKE.

SPECIFICATION forming part of Letters Patent No. 711,406, dated October 14, 1902.

Application filed January 30, 1902. Serial No. 91,872. (No model.)

*To all whom it may concern:*

Be it known that I, THOMAS J. LEABO, a citizen of the United States, and a resident of Chanute, in the county of Neosho and State of Kansas, have invented new and useful Improvements in Fluid-Pressure Brakes, of which the following is a full, clear, and exact description.

The invention relates to fluid - pressure brakes on a train having two or more engines; and its object is to provide certain new and useful improvements in fluid-pressure brakes of the Westinghouse type, whereby the engineer of the first or leading engine has complete control of the entire brake mechanism of the train and the air-brakes and main reservoirs and pumps of both engines are used to furnish the compressed air for the auxiliary reservoirs and without requiring any attention on the part of the engineer of the second engine.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in both views.

Figure 1 is a perspective view of the improvement arranged for two engines pulling a train, and Fig. 2 is an enlarged sectional side elevation of one of the valves.

The mechanisms A and A' on the first and second engines are alike in construction and consist, essentially, of the usual engineers' valves B B', connected by pipes C C' with the main reservoirs (not shown) and by the branch pipes D D' with the train-pipe E, extending the length of the train.

The train-pipe E is connected at each engine and at each car of the train by the pipes F with the several triple valves G, connected with auxiliary reservoirs H and by pipes I with the brake-cylinders J.

The improvements consist, essentially, of valves K and K', located in the branch pipes D and D' and connected by pipes L and L' with the pipes I of the mechanisms A and A' on the first and second engines, respectively. Each of the valves K and K' (see Fig. 2) is provided with a valve-seat N, over which operates a slide-valve O for opening or closing the corresponding pipe D or D', as hereinafter more fully described.

The valve-stem P of the slide-valve O carries the pistons Q and R, reciprocating in the cylinders Q' and R', respectively, the cylinder Q' being considerably less in diameter than the cylinder R', and the said cylinder Q' opens at its inner end into the corresponding pipe D or D'. The larger cylinder R' connects at its outer end with the corresponding pipe L or L', and the said cylinder R' is provided at its inner end with the small leakage-port a', leading to the outer air and allowing any air that may pass from the pipe D or D' to the cylinder Q' into the cylinder R' to pass to the outer air to relieve the inner face of the piston R of undue pressure.

The valve O is normally in an open position, and the piston Q is normally seated on a rubber-cushion ring Q², arranged on the outer end of the cylinder Q'—that is, both pistons Q and R are normally at the outer ends of the cylinders Q' and R'.

The pipes L and L' are provided with shut-off valves S and S', of which the valve S of the first or leading engine is closed and the other valve S' is open. The pipes I connect the triple valves G with the brake-cylinders J and are also provided with shut-off valves T, which are normally open and only closed in case the engine brake mechanism is out of order.

The operation is as follows: The engineer's valve B' is permanently set to a release position, so that the main reservoir of the second engine is normally in communication with the train-pipe E by way of the pipe C', the engineer's valve B', and the branch pipe D'. The slide-valve O of the valve K is always open as the valve S is closed and the piston Q is pressed on at its inner face by the full pressure in the pipe D. The slide-valve O in the other valve K' is held in an open position, owing to the preponderance of pressure against the inner face of the piston Q, it being understood that the pressure against the outer face of the piston R is atmospheric pressure, as the pipe L' and the pipe I of the mechanism A' are open to the atmosphere. Now when the engineer of the first engine moves the engineer's valve B to position for applying the brakes—that is, reduces the pressure in the train-pipe E and causes the triple valves G to connect the auxiliary reservoirs H with the brake-cylinders J—then the air-pressure in the pipe I of the second engine passes through the pipe L' into the outer end of the cylinder R' of the valve K' to force the pistons R and Q inward to move the slide-valve O of the valve K' into a closed position to disconnect the main reservoir of the second engine from the train-pipe E.

It is understood that when the air-pressure passes into the outer end of the cylinder R' and acts on the piston R of the valve K' then the pressure on the outer face of the larger piston R overcomes the pressure against the inner face of the piston Q', so that the said pistons and the valve O of the valve K' slide inwardly for the valve O to close the pipe D', as above stated. When the engineer of the first engine moves the engineer's valve B into a release position for releasing the brakes, then the air from the brake-cylinders J is exhausted by way of the pipes I and triple valves G to the outer air, and at the same time the air from the cylinder R' of the valve K' is exhausted by way of the pipe L', pipe I, and triple valve G of the second engine to the outer air, so that the main-reservoir pressure from the second engine against the piston Q causes a return movement of the said piston Q, piston R, and slide-valve O of the valve K' to again open the branch pipe D', so that the main-reservoir pressure of the second engine again passes to the train-pipe E, together with the main-reservoir pressure from the main reservoir of the first engine. Thus both engines supply compressed air to the train-pipe E to recharge the auxiliary reservoirs H.

When single engines are used simply for hauling a train, then the shut-off valve S or S' is closed, so that the slide-valve O is held always in an open position, as shown in Fig. 2.

Having thus described my invention, I claim as new and desire to secure by Letters Patent—

1. A fluid-pressure brake having a valve in the connection between the engineer's valve and the train-pipe and controlled by fluid-pressure in the brake-cylinder, as set forth.

2. A fluid-pressure brake having a valve in the connection between the engineer's valve and the train-pipe and held normally in an open position by fluid-pressure from the main reservoir, the valve being adapted to close the said connection on being moved into a closed position by the air-pressure passing from the auxiliary reservoir to the brake-cylinder by way of the triple valve, as set forth.

3. A fluid-pressure brake having a valve in the connection between the engineer's valve and the train-pipe, pistons of different areas secured on the stem of the said valve, cylinders in which the said pistons reciprocate, the smaller cylinder opening into the said connection and the larger cylinder being connected with the connection between the triple valve and the brake-cylinder, as set forth.

4. A fluid-pressure brake having a valve in the connection between the engineer's valve and the train-pipe, pistons of different areas secured on the stem of the said valve, cylinders in which the said pistons reciprocate, the smaller cylinder opening into the said connection and the larger cylinder being connected with the connection between the triple valve and the brake-cylinder, and a shut-off valve in the connection between the larger cylinder and the triple-valve brake-cylinder connection, as set forth.

In testimony whereof I have signed my name to this specification in the presence of two subscribing witnesses.

THOMAS J. LEABO.

Witnesses:
C. A. COX,
JACOB H. SHURTZ.